Nov. 20, 1928. Re. 17,143
A. C. FISCHER
SHINGLE OR BLOCK CONSTRUCTION
Original Filed April 20, 1918 2 Sheets-Sheet 1
Fig. I.
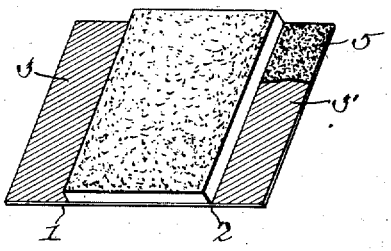
Fig. II
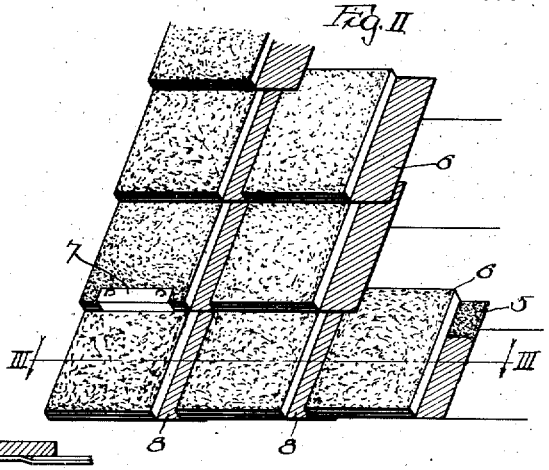
Fig. III.
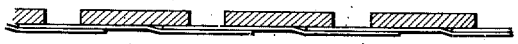
Fig. IV.
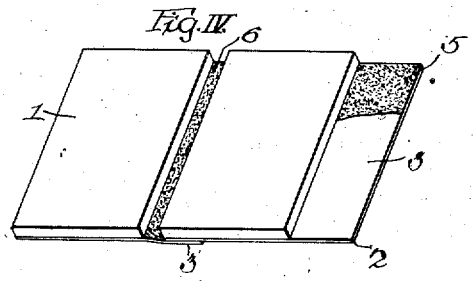
Fig. V.
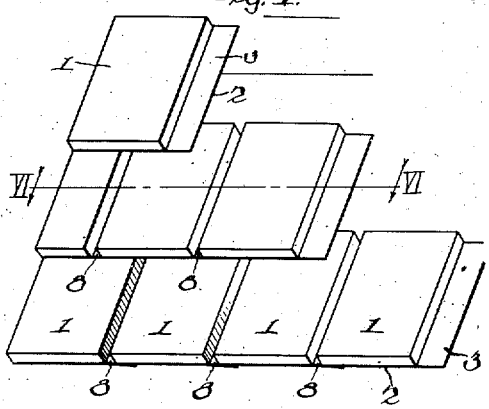
Fig. VI.
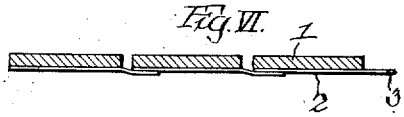
Fig. VIII.
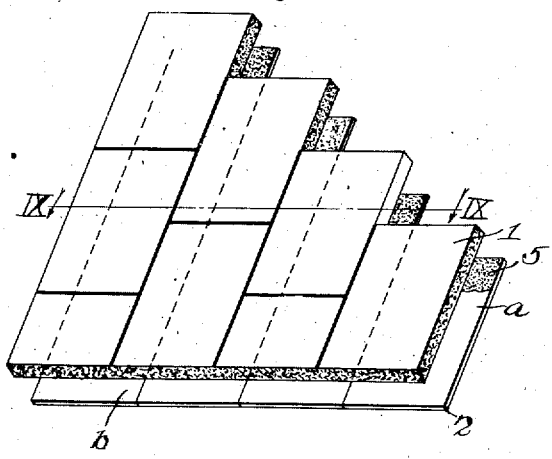
Fig. VII.
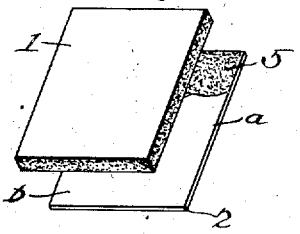
Fig. IX.
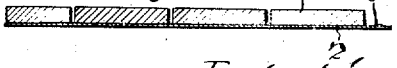
Inventor
Albert C. Fischer
George S. Haight
Atty.

Nov. 20, 1928. Re. 17,143
A. C. FISCHER
SHINGLE OR BLOCK CONSTRUCTION
Original Filed April 20, 1918 2 Sheets-Sheet 2
Fig. X.
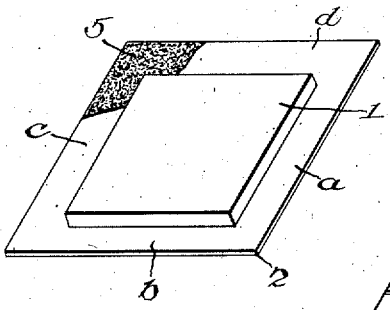
Fig. XI.
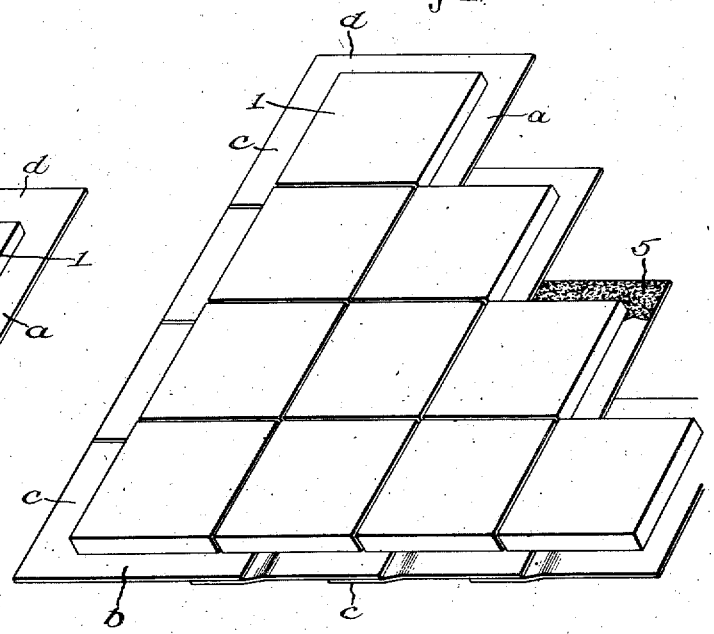
Inventor:
Albert C. Fischer:
George I. Haight
Atty.

Reissued Nov. 20, 1928. Re. 17,143

UNITED STATES PATENT OFFICE.

ALBERT C. FISCHER, OF DES PLAINES, ILLINOIS.

SHINGLE OR BLOCK CONSTRUCTION.

Original No. 1,447,290, dated March 6, 1923, Serial No. 229,681, filed April 20, 1918. Application for reissue filed March 6, 1925. Serial No. 13,647.

My invention relates to shingle and block construction and more particularly to shingles or blocks for roof or floor coverings; the principal object of the invention being to provide shingles or blocks wherein a backing portion, provided either as an integral part, or as a separate piece applied thereto, extends beyond the edges of the shingle or block body so that it may underlie the edges of a juxtaposed shingle or block to effect a closed joint and prevent leakage therebetween.

It is also an object of the invention to provide shingles or blocks of this character wherein the backing extends from one or more edges thereof and wherein such extended edges are provided with a mastic coating, such as asphalt, tar, or the like whereby overlapped portions may be sealed and bonded together to make a weather proof and serviceable roof.

In accomplishing these objects, I have provided improved details of structure the preferred forms of which are illustrated in the accompanying drawings, wherein:—

Fig. I is a perspective view of a preferred form of shingle constructed according to the present invention.

Fig. II is a perspective view of a portion of a roof covered with shingles constructed and applied according to the present invention.

Fig. III is a cross-sectional view, on the line III—III Fig. II, illustrating the laying of the shingles and the over-lapped relation of the backing edges.

Fig. IV is a detail perspective view of shingles of a slightly modified form wherein the backing extends only at one side of the shingle body.

Fig. V is a perspective view of a part of a roof, illustrating the preferred method of applying the shingles of the type shown in Fig. IV.

Fig. VI is a cross sectional view on the line VI—VI, Fig. V.

Fig. VII illustrates another form of shingle wherein the backing member is of the same size as the shingle, but is offset at one side and end thereof.

Fig. VIII is a perspective view illustrating the preferred method of assembling the shingles shown in Fig. VII, to cover a roof.

Fig. IX is a sectional view on the line IX—IX, Fig. VIII.

Fig. X is a detail perspective view of another form of shingle wherein the backing member extends at all sides of the shingle body.

Fig. XI is a perspective view illustrating the assembly upon a roof of shingles having the construction shown in Figure X.

Referring more in detail to the drawings:

In Fig. I, I have shown the preferred form of a shingle. This shingle comprises a body portion 1 which may be of composition felt and asphalt construction of any desirable thickness and is here shown as having a gravel coating to insure a durable wearing surface.

The body 1 is provided with a backing strip 2, preferably a heavy strip of tarred paper, felt or similar substance, which is applied to or formed as a part of the body so that the opposite edges 3—3′ thereof extend substantially beyond the side edges of the shingle body.

The backing 2, the same as the shingle bodies, may be made in different thicknesses and may be applied by sticking the same to the shingle body after the latter has been formed or may be made as a part of the body, and is preferably a flexible and pliable material, and while it is not always necessary, in most instances the upper surfaces of the exposed margins of the backing strips are coated with a layer 5 of asphalt, tar or similar substance so that when the shingles are laid on the roof, as is presently described, the coating will serve to stick or seal the overlapped edges together to close the joint between the shingles.

When laying these shingles to cover a roof, the lower course is placed first, with the bodies 1 of the shingles spaced apart and leaving drainage channels 8 between them, which may be alined if desired to provide continuous channels through the whole incline of the roof. The protruding margins 3, 3′ of the backing strips, at opposite sides of each shingle, extend, respectively, over and beneath the protruded margins of the backing strips of adjacent shingles at opposite sides thereof, and thus not only form water-tight joints but also provide the bottoms of the drainage channels. The overlying backing strip for instance, strip 3 in each instance is extended slightly beneath the body 1 of the adjacent shingle, that is to say, between said body and its backing strip, whereby the free edges of said overlying backing strips are interlocked against curling up of the strip or opening of the seam. The mastic coating serves to make the strips adhere together, and so seals the joints that leakage therebetween is prevented.

Small nails or tacks may be driven through the upper edges of the shingles as shown at 6 to anchor the same to the roof or else small cleats as shown at 7 may be applied to their free end or side margins which more effectively hold the same in place.

The following courses are then laid to slightly overlap the upper edge of the shingles of the first courses and preferably as shown in Fig. II, with the spaces between the shingles of each course in alignment, as this forms a serviceable and the most attractive roof, although a very serviceable roof is provided when the shingles are laid in broken joints.

Fig. IV shows a slight modification from the preferred form of shingle in that the base or backing extends only at one side of the shingle body. Shingles of this construction are laid, as shown in Fig. V, a little closer together than those first described and may be laid in either straight or broken joint courses. The extended or marginal portions of the backing of these shingles may also be coated with a mastic substance and when laid are extended beneath the edge of the adjacent shingle sufficiently that an effective sealed joint is made. Shingles of this construction are also laid in courses and are overlapped as shown in Fig. V and may be fixed to the roof either with tacks, cleats or in any other desirable manner.

The form of shingle illustrated in Figs. VII, VIII, and IX is still another modification of that shown in Fig. I. In this type the backing member is cut the same size as the shingle body and is then applied thereto so that its margins —*a*— and —*b*— extend at one side and at the lower end of the shingle body, and when the shingles are laid to cover a roof, as shown in Fig. VIII, they are placed with their body portion tightly together without over-lapping one another, but with marginal portions of the backing members overlapping one another and underlying adjacent body portions, and preferably in straight, vertical and broken horizontal joints.

It will be noted that in this construction and method of laying the shingles all vertical joints between shingle bodies are entirely closed by the underlying backing strip margins *a* and the horizontal joints are closed by the underlying backing margins *b*, and said margins *a* and *b*, and also the edges of the shingle bodies when coated with a mastic substance, will bond the shingles together to form practically a single sheet of roofing and will absolutely seal all the joints against leakage.

The shingle shown in Fig. X differs from the others only in that the backing strip 2 has margins *a*—*b*—*c* and *d* extending at all margins of the shingle body. Shingles of this construction are laid, as shown in Fig. XI, close together with the joints either broken or in alignment, and the margins of the backing at opposite edges of the bodies extended respectively beneath and above the margins of the backing members of adjacent shingles, the upper margins in each instance being extended between the shingle bodies and their backing strips. Various means, such as tacks, cleats, etc. may be used to hold the shingles in place.

It is apparent that shingles or blocks of the present character should be made at a reasonable cost and when properly applied would form a serviceable and durable roof.

It is also apparent that by coating the edges of the backing strip with the mastic material, when the edges are placed in overlapped relation the mastic will join the parts together and seal the joint to positively prevent weather leakage therethrough.

While I have shown the preferred methods of laying the shingles it is apparent that various other designs could be used without departing from the spirit of the invention.

It is also noted that while I have described the shingles as being of composition construction with a flexible backing, which is preferred because the flexibility of the backing adapts it to be pressed out of its own plane in developing a smooth upper surface on the body portion which overlaps the margins of the backing members, yet some of the advantages of the present invention, as for instance, introducing the margin of one backing member between the body and backing member of an adjacent shingle, would still be present even if the shingles be made of slate, tile or other non-flexible material and still be applied in the same manner, and I therefore do not wish to be limited to any particular material of construction.

I claim:

1. A roof comprising shingles, each of which comprises a body portion having a flexible backing portion extending from opposite side edges thereof, said shingles being arranged with one of the extending portions of certain of said shingles lying between the body portion and the backing of an adjacent shingle.

2. In a roof, flexible shingles comprising body portions each having flexible backing portions extending from opposite edges thereof, with the extended backing portions of adjacent shingles overlapping, and one of them extending beneath the adjacent body portion.

3. A shingle comprising a body portion having a backing member extended at an edge or edges thereof and separable from the body portion near the edge or edges of the latter.

4. A roof comprising shingles each of which comprises a body portion having a flexible backing portion extending from a side edge thereof, said shingles being arranged with the extending portions of certain of said shingles underlying and adhering to portions of adjacent shingles.

5. A roof comprising shingles each of which comprises a body portion having a flexible backing portion extending from a side edge thereof, said shingles being arranged with the extending portions of certain of said shingles lying between the body portion and the backing of an adjacent shingle.

6. A shingle comprising a body portion having a flexible backing extending from an edge thereof said backing portion being separable from said body portion near an edge of said body portion.

7. A shingle, or the like, comprising a rectangular body portion of substantial thickness, and a backing portion affixed to the body portion, presenting free marginal portions extending at a side and end thereof, and separable from the body portion near the edge of the latter.

8. In a roof or the like, the combination of shingles in courses, said shingles comprising body portions having backing members applied thereto in position to leave flexible marginal portions extending beyond the edges of the body portions, said portions having mastic coating applied thereto; said shingles being assembled with their body portions in substantially the same plane, with their flexible marginal portions lapped one over another, and with each outer marginal portion extending in between the underlying marginal portion and the body which carries it.

9. In a shingle roof, shingles comprising body portions of substantial thickness and backing members of flexible material providing flexible marginal projections thereon; said shingles being assembled with their body portions in substantially the same plane, with their edges in the direction of drainage spaced apart to develop drainage channels between them, and with their marginal portions overlapped in position to provide bottoms to said drainage channels.

10. Weatherproof covering, comprising shingles, each shingle having an interlocking opening formed in its thickness parallel with the plane of shingle and near the edge thereof, said interlocking opening being formed to leave a greater thickness of shingle above the same than below the same, and being adapted to receive the lesser thickness made by a similar interlocking opening formed in an adjacent shingle, for joining two or more shingles in a row and with the weathering surface of the joined shingles in the same plane.

11. A shingle comprising a body portion having a backing member separable from the body portion near the edge of the latter, the separation of the backing member providing an opening for the reception of a similar backing member on an adjacent shingle for joining two or more shingles in a row with their weathering surface in the same plane.

12. An asphaltic shingle comprising a body and an extension projecting therefrom, said body having an interlocking opening therein, one end of which terminates at the edge of the shingle and is adapted to receive an interlocking projection on an adjacent shingle, that portion of the material of the shingle which is divided by the interlocking opening being constructed and arranged to overlie and underlie the underlying projection of an adjacent shingle when inserted in said opening.

13. Roofing material composed of superimposed off-set thicknesses of waterproofed material adherently united at one area, and freely separated at another area to receive a portion of another roofing material, one of the thicknesses of said material on its off-set margin carrying a mastic substance.

14. A prepared asphaltic shingle comprising a body and an extension projecting therefrom, said body having an interlocking means formed therein wherein an adjacent shingle may be locked, with one part of its surface overlying the first mentioned shingle, and another part of its surface underlying the first mentioned shingle, said interlocking means terminating at a marginal portion of the shingle.

15. A flexible shingle comprising a body and an extension projecting therefrom, said body having an interlocking means formed as an opening in said body and extending inwardly from one of the marginal edges thereof, and adapted to interlockingly receive a portion of an adjacent shingle, whereby to form an interlocking overlap between said shingle.

16. In combination two preformed asphaltic shingles, each shingle comprising a body and an extension projecting therefrom having an opening formed therein extending from one edge of the body inwardly and substantially parallel with an angularly disposed edge, one of said shingles having a projecting portion inserted in said opening so as to underlie a portion of the first mentioned shingle and to interlock therewith.

In witness that I claim the foregoing I have hereunto subscribed my name this 5th day of March, 1925.

ALBERT C. FISCHER.